(No Model.)
A. J. GREINER.
EARTH AUGER.
No. 493,769. Patented Mar. 21, 1893.
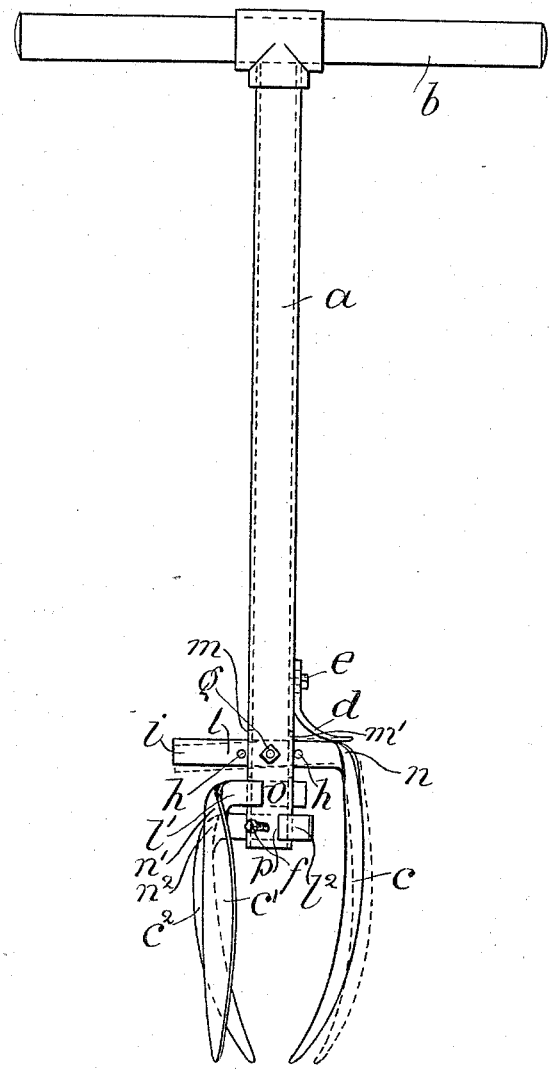
Witnesses
Laura Collins
W. E. Deright
Inventor
Abraham J. Greiner

UNITED STATES PATENT OFFICE.

ABRAHAM J. GREINER, OF CHICAGO, ILLINOIS.

EARTH-AUGER.

SPECIFICATION forming part of Letters Patent No. 493,769, dated March 21, 1893.

Application filed November 18, 1892. Serial No. 452,433. (No model.)

*To all whom it may concern:*

Be it known that I, ABRAHAM J. GREINER, a citizen of the United States, residing at Chicago, in the county of Cook and State of Illinois, have invented a new and useful Earth-Auger, of which the following is a specification.

My invention relates to improvements in earth augers.

The primary object of the invention, is to construct an earth auger, with adjustable cutting-blades, attached directly to the shank of the auger, dispensing with any auger head or common support for cutting-blades, thereby constructing the auger with the least possible expense, and very strong and durable. With a further object in view of having one of the cutting-blades to open and close by means of foot pressure and small spring attached to shank of auger, thereby making a simple and inexpensive means of releasing any earth collected therein, in boring in wet ground, and further object of providing simple and inexpensive means of securing fixedly, the cutting blades while boring, and yet allowing them to be adjusted so as to bore any size hole.

The invention consists in the improved mechanism of the blades and blade-shanks, and manner of operating one of them, and the combination of parts, and features of construction, hereinafter specified and particularly pointed out.

Referring to the accompanying drawing; the figure is a side view of the auger complete, and ready for operation.

Letter $a$ is the shank of auger which may be hollow or otherwise, and provided with a handle, $b$.

Letters $c$, $c'$ and $c^2$ are the cutting-blades and are attached to the lower end of the shank $a$ equidistant apart by means of the blade-shanks $l$, $l'$, $l^2$, which are at almost right angles to the cutting-blades, and turned or twisted at the angles $n$, $n'$, $n^2$ so that they extend edgewise through and beyond the shank of auger, in perpendicular elongated openings $m$, $o$, $p$. The cutting-blades $c'$ $c^2$ are secured to the auger shank $a$ by set screws as $f$ which pass into the shank $a$, and abut against the blade-shanks $l'$ $l^2$ holding the cutting-blades fixedly, and permitting them to be adjusted so that any size hole can be bored. The cutting-blade $c$ or top blade has a number of small holes $h$, through its blade-shank and is secured to shank of auger $a$, by means of small bolt or pin Q passing through the shank and one of the holes of the blade-shank, permitting the cutting-blade to be adjusted or removed. The openings $m$, $m'$ through which the top cutting-blade $c$ passes, are extended at the top part of $m'$ and lower part of $m$, sufficiently long enough to allow the blade-shank $l$ to move up and down, so that when the foot is pressed on top of the blade-shank at the end $i$ immediately the cutting-blade opens as indicated by dotted lines near letter $c$. The cutting-blade $c$ is closed and held in place, immediately after removing the foot pressure, by means of spring $d$ fastened to shank of auger, by screw $e$ which passes through a slot in the upper part of the spring thereby permitting the spring to be adjusted, so as to govern the pressure of the spring upon the blade-shank. The cutting-blades $c$ $c'$ $c^2$ vary in length, the lower one $c^2$ being the shortest, $c'$ a little longer, and $c^2$ the top blade the longest.

Having fully described my invention, what I claim as new, and desire to secure by Letters Patent, is—

1. The combination with the shank provided with a handle, of cutting-blades attached directly to the shank by means of blade-shanks which extend through the lower end of shank $a$, into elongated openings equidistant apart, dispensing with any auger head or common support, substantially as described.

2. The combination with the shank of cutting-blades varying in length with blade-shanks twisted, and extending edgewise or vertically into shank, said cutting-blades being held secure in the shank of the auger, by setscrews into the shank abutting against the blade-shanks substantially as described.

3. The combination with the shank of one of the cutting-blades opening outward by means of the foot pressing on one end of the blade shank, the blade-shank having a number of small holes through which passes a small bolt securing the cutting-blade to the shank, the cutting blade being closed inward and held in place by a spring fastened to shank of auger, with a screw extending through a vertical slot in top part of spring substantially as described.

In testimony whereof I have affixed my signature in the presence of two witnesses.

ABRAHAM J. GREINER.

Witnesses:
LAURA COLLINS,
W. E. DWIGHT.